Dec. 20, 1955 R. LAPSLEY 2,727,606
CLUTCH CONSTRUCTION
Filed May 10, 1951

INVENTOR.
ROBERT LAPSLEY
BY
ATTYS.

United States Patent Office 2,727,606
Patented Dec. 20, 1955

2,727,606

CLUTCH CONSTRUCTION

Robert Lapsley, Buchanan, Mich., assignor to Clark Equipment Company, Buchanan, Mich., a corporation of Michigan Application May 10, 1951, Serial No. 225,643

13 Claims. (Cl. 192—48)

My present invention relates generally to a clutch construction for use, for example, in clutching the pump and turbine elements of a torque converter together for conjoint rotation.

It is a primary object of my present invention to provide a clutch construction for selectively positively clutching a drive member to a driven member for conjoint rotation at practically the instant of synchronous relative rotation, through the use of two sets of cooperating uni-directional clutch teeth, the first set being arranged to be automatically projected into driving relation so as to prevent counter relative rotation, during which movement the second set, when selected and/or ordered, may be projected into driving relation for the other direction of relative rotation an instant before the first set of clutch teeth reach actual driving engagement.

It is another object of my present invention to provide a clutch construction for automatically positively clutching a drive member and a driven member together in one direction of rotation at practically synchronous speed of the drive member relative to the driven member and for pre-selectively ordering and then automatically positively clutching the drive member and the driven member together in both directions of rotation of the drive member relative to the driven member.

It is another object of my present invention to provide a clutch construction comprising first and second clutch elements wherein the first clutch element is adapted to clutch a drive member and a driven member together in one direction of rotation of the drive member relative to the driven member and the second clutch element while the first clutch element is engaging, is adapted to clutch the drive and driven members together in the other direction of rotation of the drive member relative to the driven member.

It is a further object of my present invention to provide a clutch construction of the character last noted characterized by the provision of shift means operable when the first clutch element is disengaged to prevent engagement of the second clutch element.

It is a further object of my present invention to provide shift means of the character noted which is adapted to selectively effect engagement of the second clutch element when the first clutch element is engaged.

It is a still further object of my present invention to provide shift means, as described, which is adapted to selectively maintain both of the first and second clutch elements engaged.

I propose to accomplish the aforementioned objects by providing a first annular clutch element having internal splines which are adapted to cooperate with external splines formed on the driven member. A second annular clutch element is provided having internal splines which are adapted to cooperate with external splines on the first clutch element. Each of the first and second clutch elements has a plurality of circumferentially spaced radial clutch teeth which are adapted to cooperate with circumferentially spaced radial clutch teeth formed on the drive member. The second clutch element has external helical threads which cooperate with internal helical threads formed in an axially fixed annular spring carrier. A coil spring friction clutch is carried on the outer periphery of the spring carrier and the coil spring friction clutch is operable upon rotation of the drive member in one direction relative to the driven member to clutch the spring carrier to the drive member whereby the second clutch element is caused to be threaded axially for effecting engagement of the clutch teeth of the second clutch element with the associated clutch teeth of the drive member.

A radial pin member adapted to be selectively spring loaded, is disposed through a slot formed in the driven member and the first clutch element and is adapted to engage the second clutch element when the clutch teeth of the latter are disengaged from the clutch teeth of the drive member for preventing axial movement of the first clutch element and engagement of the clutch teeth of the first clutch element with the associated clutch teeth of the drive member. The pin member, when spring loaded and the clutch teeth of the second clutch element are in engagement with the associated clutch teeth of the drive member, is adapted to effect engagement of the clutch teeth of the first clutch element with the associated clutch teeth of the drive member. The pin member is further adapted to selectively maintain the clutch teeth of the first and second clutch elements in engagement with the associated clutch teeth of the drive member in either direction of rotation of the drive member relative to the driven member.

The above described clutch construction in the present disclosure is embodied in a transmission for clutching the pump and turbine elements of a torque converter together for conjoint rotation. It will, however, be readily apparent that the clutch construction may be embodied in any one of a number of devices wherein it is desired to clutch together drive and driven members selectively in one direction of rotation and selectively in both directions of rotation of the drive member relative to the driven member. I, therefore, do not intend to limit the application of my clutch construction to a torque converter assembly for my invention may be utilized in innumerable instances.

Now, in order to acquaint those skilled in the art with the manner of constructing and using the device of my present invention, I shall describe in connection with the accompanying drawing, a preferred embodiment of my invention.

Figures 1, 2, 3:
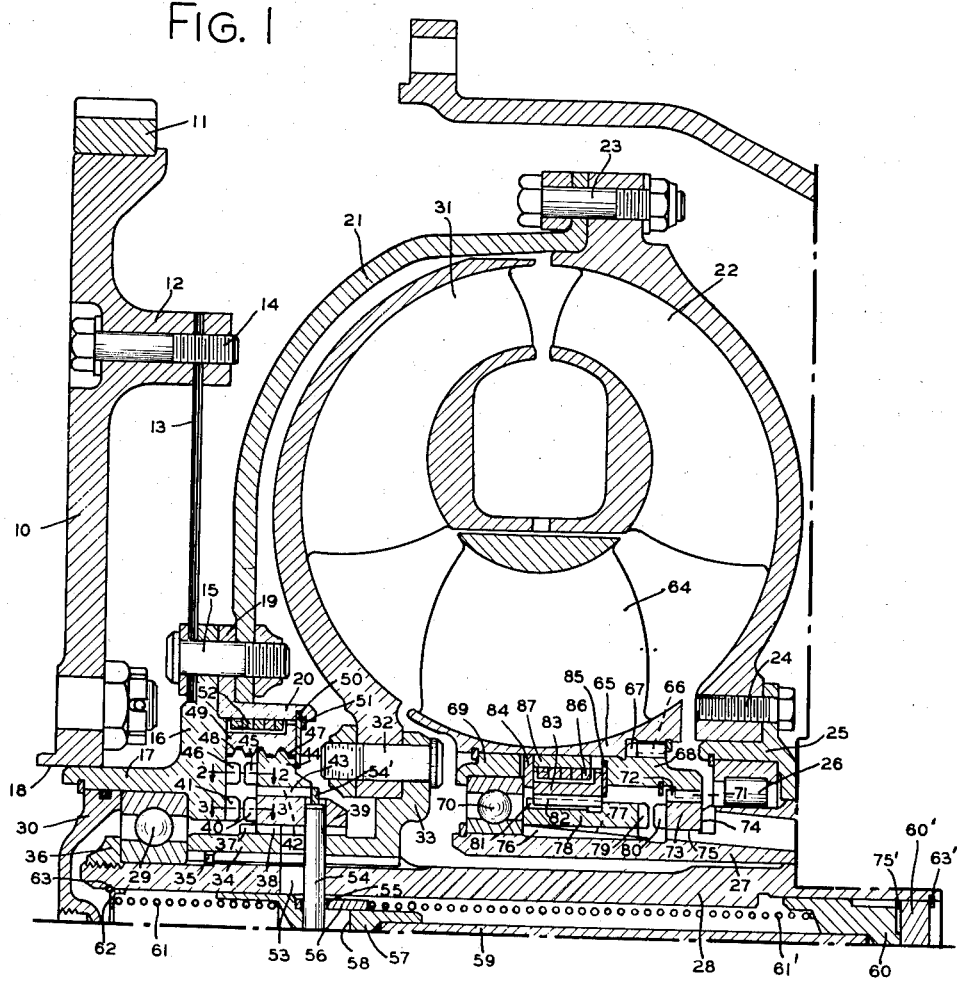
Figure 1 is a partial vertical sectional view of a transmission embodying the clutch construction of my present invention.
Figure 2 is a sectional view of one pair of clutch teeth of the clutch construction of my present invention taken along the line 2—2 in Figure 1, looking in the direction indicated by the arrows.
Figure 3 is a sectional view of a second pair of clutch teeth of the clutch construction of my present invention taken along the line 3—3 in Figure 1, looking in the direction indicated by the arrows.

Referring now to the drawing, there is shown an engine flywheel 10 to which, at the outer periphery thereof, is secured an external starter ring gear 11. The engine flywheel 10 is formed with a plurality of circumferentially spaced laterally projecting bosses, to which a plurality of flexible discs 13 are secured at their outer peripheries by suitable bolts 14. The discs 13, at their inner peripheries, are suitably secured by circumferentially spaced bolts 15 to the radial flange portion 16 of a tubular hub member 17, suitably piloted in a central opening 18 formed in the engine flywheel 10. The flexible discs 13 are provided for absorbing end thrust of the hub 17 for preventing such end thrust from being transmitted to the engine flywheel 10.

The radial flange 19 of an annular clutch drum 20 is received in a circumferential recess formed in the radial flange 16 of hub member 17. A torque converter housing 21 is secured, at the inner periphery thereof together with the radial flange 19 of the clutch drum 20, to the radial flange 16 of hub member 17 by means of the aforementioned bolts 15. Secured to the converter housing 21, at the outer periphery thereof, by circumferentially spaced bolts 23, is a pump element 22. The pump element 22, at its inner periphery, is secured by a plurality of circumferentially spaced bolts 24 to a hub member 25, which is journaled on a roller bearing assembly 26. The roller bearing assembly 26 is, in turn, journaled on a stationary sleeve member 27. A tubular driven shaft 28 is journaled at one end in the stationary sleeve member 27 and the shaft 28, at its other end, is journaled within a ball bearing assembly 29 mounted within the hub member 17. The end of shaft 28 is preferably closed by a suitable plate member 30 seated in the end of the hub member 17, substantially co-planar with the engine flywheel 10.

Mounted for rotation within the converter housing 21 is a turbine element 31 which is secured at its inner periphery by a plurality of circumferentially spaced bolts 32 to the radial flange portion 33 of a hub member 34. The hub member 34, at the inner periphery thereof, is formed with internal splines which are adapted to cooperate with external splines formed on the shaft 28. The hub member 34 is located axially by means of a retainer ring member 35. The retainer ring 35 is held in position against a shoulder formed in the shaft 28, by means of the aforementioned ball bearing assembly 29, which bears against the end of the hub member 34 and is held in position by means of a nut 36 threaded onto the end of the shaft 28.

Mounted within the converter housing 21, intermediate of the pump element 22 and the turbine element 31, is a stator or reaction member 64 having a hub portion 65, which, at one end thereof, is formed with internal splines 66 which cooperate with the external splines 67 of a bushing member 68. The hub 65, at its other end, is journaled through an annular ring member 69 on a ball bearing assembly 70, mounted on the aforedescribed stationary sleeve member 27. The bushing member 68 at one end thereof is formed with internal splines 71 which mate with the external splines 72 of an annular brake element 73, which is held against axial movement by the radial shoulder 74 formed in the stationary sleeve member 27. The brake element 73 rotates conjointly with the reaction member 64 and at its inner periphery is suitably seated on a bearing portion 75 of the stationary sleeve member 27.

The stationary sleeve member 27 is formed with external helical splines 76, intermediate of the ball bearing assembly 70 and the brake element 73. Cooperating with the external helical splines 76, are the internal helical splines 77 of an annular brake element 78. The brake element 78 is formed with radially extending circumferentially spaced jaw clutch or ratchet teeth 79 which are adapted to cooperate with radial circumferentially spaced jaw clutch or ratchet teeth 80 formed integrally with the brake element 73. The brake element 78 is formed with external splines 81 which cooperate with internal splines 82 formed in a spring carrier member 83, held against axial movement by retaining washers 84 and 85. Mounted on the outer periphery of the spring carrier 83 is a coil spring 86 which, at one end, is fixed in the spring carrier 83 and at its other end is free. The outer periphery of the coil spring 86 is normally adapted to lightly frictionally engage the annular flange portion 87 of the aforedescribed bushing member 68.

Upon initial rotation of the pump and turbine elements 22 and 31 in one direction, the reaction member 64 tends to rotate in the opposite direction. Simultaneously, the coil spring 86 is caused to expand whereupon its frictional engagement with the annular flange 87 increases. This frictional engagement causes the brake element 78 to be threaded axially to the right, as viewed in Figure 1, thereby disposing the clutch teeth 79 into engagement with the clutch teeth 80 of brake element 73, positively braking the reaction member 64 to the stationary sleeve member 27. When the clutch teeth 79 and 80 are in engagement and the reaction member 64 is held stationary, the torque converter unit functions as a torque multiplier. As the pump and turbine elements 22 and 31 reach synchronous speed, oil impinges on the rear face of reaction member 64, causing the latter to tend to rotate in the same direction as the pump and turbine elements. When this occurs, the brake element 78 is caused to be threaded axially to the left, to the position shown in Figure 1, by virtue of the frictional engagement of the spring 86 with the annular flange 87. The clutch teeth 79 and 80 are disengaged and the reaction member 64 is free to rotate in the same direction as the pump and turbine elements 22 and 31. In this condition of operation, the torque converter unit functions as a fluid coupling. It will thus be readily apparent that engagement or disengagement of the clutch teeth 79 and 80 is dependent upon the direction of rotation of the reaction member 64. The aforedescribed brake construction forms the subject matter of my co-pending application, Serial No. 42,258, filed August 3, 1948, now Patent No. 2,611,452, patented September 23, 1952.

I shall now describe the details of construction and operation of the clutch construction of my present invention. In the following description, the directions of rotation are referred to as if viewed looking toward the engine flywheel from the right-hand side of Figure 1.

The aforedescribed hub member 34, splined to the shaft 28, is formed with external splines 37 which cooperate with the internal splines 38 of a clutch ring or element 39. The clutch element 39 at one end is formed with radial circumferentially spaced jaw clutch or ratchet teeth 40, which are adapted to cooperate with radial circumferentially spaced jaw clutch teeth or ratchet teeth 41 formed on the hub member 17. As shown in Figure 3, the clutch teeth 40 are formed with ramps 90 and driving faces 91 and the clutch teeth 41 are formed with ramps 92 and driving faces 93.

The clutch element 39 is formed with external splines 42 which are adapted to cooperate with the internal splines 43 of a clutch ring or element 44. The clutch element 44 at one end is formed with a plurality of radial circumferentially spaced jaw clutch or ratchet teeth 45, which are adapted to cooperate with a plurality of radial circumferentially spaced jaw clutch or ratchet teeth 46 formed on the hub member 17. As shown in Figure 2, the clutch teeth 45 are formed with ramps 94 and driving faces 95 and the clutch teeth 46 are formed with ramps 96 and driving faces 97. The planes of the faces of the ramps 94 and 96 extend diagonally of the planes of the faces of the ramps 90 and 92.

The clutch element 44 is formed with an external left-hand helical thread 47 which cooperates with an internal left-hand helical thread 48 formed in an annular spring carrier member 49 fixed against axial movement between the radial flange 16 of hub member 17 and a thrust washer 50 positioned in the clutch drum 20 by a retainer ring 51. The spring carrier 49 at its outer periphery carries a coil spring 52. The spring 52 is fixed at one end in the spring carrier 49 and is free at its other end. The spring 52 at its outer periphery is adapted normally to lightly frictionally engage the inner periphery of the clutch drum 20.

A radially extending slot 53 is formed in the shaft 28 and the hub member 34. A radially extending pin member 54 is disposed within the slot 53 and at its outer end extends through an opening formed in the clutch element 39. The pin member 54 is retained in place by a spring ring 54' which is adapted to abut the one end of the clutch element 44. The pin member 54 at its inner end extends through an opening 55 formed in a sleeve member 56 which is disposed within the tubular shaft 28 and is mounted for axial sliding movement on a member 57. The member 57 has a radial slot 58 formed therein, which receives the inner end of the pin member 54. The member 57 is suitably secured to an axially extending rod 59 which, at its other end, has secured thereon a piston assembly 60 slidably mounted within the tubular shaft 28. A suitable plug member 60' is mounted in the shaft 28 and a fluid chamber 75' is defined between the plug member 60' and the piston 60. The plug member 60' is restrained against axial movement in one direction by means of a retaining ring 63'. A coil spring 61 is disposed within the shaft 28 between the member 57 and a washer 62, held against axial movement in one direction by means of a retaining ring 63 secured in the shaft 28. A second coil spring 61' is disposed within the shaft 28 between the piston assembly 60 and the sleeve member 56.

The engine flywheel 10 normally rotates in an anti-clockwise direction and through the fluid torque converter unit drives the turbine or driven shaft 28 in an anti-clockwise direction at a slower speed than the flywheel 10, due to the fluid slip between the pump element 22 and turbine element 31 of the fluid torque converter unit. When substantially synchronous speed is reached between the engine flywheel 10 and the driven shaft 28, as would occur when the vehicle in which the transmission of my present invention is embodied is no longer accelerating, and the shaft 28 is permitted to overrun the engine flywheel 10 slightly, the above described clutch construction of my present invention is adapted to clutch the engine flywheel 10 and the shaft 28 together for conjoint rotation. The engine flywheel 10 and the shaft 28 are also clutched together when the vehicle is coasting and the shaft 28 tends to overrun the engine flywheel 10. When the vehicle is coasting, the engine flywheel 10 tends to rotate in a clockwise direction relative to the shaft 28.

When the engine flywheel 10 is overrunning the shaft 28, the coil spring friction clutch 52 tends to wrap about the spring carrier 49 and therefore the spring 52 only lightly frictionally engages the clutch drum 20. In this condition of operation, the spring carrier 49 rotates with the shaft 28. When substantially synchronous speed is reached between the engine flywheel 10 and the shaft 28 and shaft 28 overruns engine flywheel 10 slightly, the coil spring friction clutch 52 expands radially increasing the frictional engagement with the clutch drum 20, which tends to cause the spring carrier 49 to rotate with the clutch drum 20 and the engine flywheel 10. The spring carrier 49 thus tends to rotate clockwise relative to clutch element 44, which, through the helical threads 47 and 48, causes the clutch element 44 to be threaded to the left, as viewed in Figure 1. Upon movement of the clutch element 44 to the left, the ramps 94 of clutch teeth 45 will engage the ramps 96 of clutch teeth 46. Engagement of the driving faces 95 and 97 of the clutch teeth 45 and 46 will take place when the driven shaft 28 initially begins to overrun the flywheel 10. That is, when the flywheel rotates clockwise relative to the shaft 28. Full engagement of the clutch teeth 45 and 46 will be completed in less than 20° of overrunning of the driven shaft 28 relative to the flywheel 10. Upon acceleration of the engine flywheel 10, relative to the shaft 28, the coil spring friction clutch 52 again wraps about the spring carrier 49. Frictional engagement of the spring 52 with the clutch drum 20 is decreased and the spring carrier 49 again rotates with the shaft 28. Also upon acceleration of the flywheel 10, the clutch teeth 45 and 46 will be thrust out of engagement due to the camming action between ramps 94 and 96 and the threads 47 and 48 which will effect movement of the clutch element 44 to the right, to the position shown in Figure 1. Drive between the flywheel 10 and the shaft 28 is then returned through the fluid torque converter unit.

From the foregoing description, it will be readily apparent that I have provided a one way clutch between the engine flywheel 10 and the shaft 28, which will permit drive to be effected from the flywheel 10 to the shaft 28 through the fluid torque converter unit when acceleration is desired, and which will couple the engine flywheel 10 and the shaft 28 together when substantially synchronous speed is reached. Thus, when the vehicle is coasting and the shaft 28 begins to overrun the flywheel 10, the flywheel 10 and shaft 28 are clutched together, thus making it possible for the engine to act as a brake on the vehicle. The above clutch construction also locks the flywheel 10 and shaft 28 together when the vehicle is being pushed, thus permitting the engine to be started should the starter motor fail.

If it should be desired to clutch the flywheel 10 and shaft 28 together in both directions of rotation after synchronous speed between the flywheel 10 and shaft 28 has once been reached, fluid under pressure is selectively admitted to the chamber 75' adjacent the end of the piston assembly 60, mounted within the shaft 28. Admission of fluid under pressure to the chamber 75' causes the piston assembly 60, together with the rod 59 and the member 57, to be urged to the left from the position shown in Figure 1. During this shifting movement, member 57 compresses the spring 61 to remove its pressure from the inner end of pin member 54 and allows the lighter pressure of spring 61' to urge pin 54, with the clutch element 39, towards the left also. At the completion of the shift of member 57 to the left, the pin member 54 is spring loaded by means of the spring 61' acting through the sleeve member 56. Although the pin member 54, together with the clutch element 39, is spring loaded, movement to the left does not take place due to the fact that the spring ring 54' engages the rear end of the clutch element 44, which is being urged to the right against locating washer 50. However, at substantially synchronous speed of the engine flywheel 10 and shaft 28, when the latter initially begins to overrun the flywheel 10, as fully described above, the coil spring 52 engaging the clutch drum 20 causes the spring carrier 49 to tend to rotate with the clutch drum 20. This tendency of the spring carrier 49 to rotate with the clutch drum 20 causes the threads 47 and 48 to effect movement of the clutch member 44 to the left, as viewed in Figure 1, thereby disposing the clutch teeth 45 and 46 into engagement, as fully described above.

Movement of the clutch element 44 to the left permits movement of the spring loaded clutch element 39 to the left. At the moment that the clutch teeth 45 and 46 begin to engage, the ramps 90 of clutch teeth 40 will engage the ramps 92 of clutch teeth 41. The instant before the clutch teeth 45 and 46 are in complete engagement, the spring biased shift means will snap the clutch teeth 40 substantially into driving relation with the clutch teeth 41. However, before the driving faces 91 and 93 of clutch teeth 40 and 41 are disposed in driving engagement, the flywheel 10 must be accelerated. Engagement of the clutch teeth 45 and 46 and clutch teeth 40 and 41 is effected without gear clash or shock. When the clutch element 39 is in its extreme left position, the pin member 54 is disposed at the left side of the slot 53 formed in the shaft 28 and hub member 34, with the spring ring 54' abutting the end of the clutch element 44. The inner end of pin member 54 is also disposed at the left end of slot 58 formed in member 57. The spring 61' acting through the sleeve 56 and pin member 54 maintains the clutch elements 39 and 44 in their extreme left positions irrespective of whether the flywheel 10 is tending to overrun the shaft 28 or vice versa.

When it is desired to disengage the clutch element 39, the fluid under pressure in chamber 75 is bled therefrom. The coil spring 61, at the left end of shaft 28, as viewed in Figure 1, thereupon urges the member 57, together with pin member 54 and clutch element 39, to the right to the position shown in Figure 1. The clutch element 44 will remain in its extreme left position until the engine 10 tends to overrun the shaft 28. As described fully above, upon overrunning of the engine flywheel 10, relative to the shaft 28, the clutch teeth 45 and 46 are disengaged as a result of the clutch element 44 being threaded axially to the right, as viewed in Figure 1.

It will thus be seen that I have provided a clutch construction for selectively positively clutching a drive member and a driven member together in one direction of rotation of the drive member relative to the driven member, and for selectively positively clutching the drive member and the driven member together in both directions of rotation of the drive member relative to the driven member.

While I have shown and described what I believe to be a preferred embodiment of my present invention, it will be understood that various modifications and rearrangements may be made therein without departing from the spirit and scope of my present invnetion.

I claim:

1. In combination, a drive member, a driven member, a first clutch element for clutching said drive and driven members together, a second clutch element for clutching said drive and driven members together, means for effecting engagement of said second clutch element upon rotation of said drive member in one direction relative to said driven member and for effecting disengagement of said second clutch element upon rotation of said drive member in the other direction relative to said driven member, means for preventing engagement of said first clutch element when said second clutch element is disengaged, and means for selectively effecting engagement of said first clutch element when said second clutch element is engaged or during the moment immediately preceding the actual engagement of said second clutch element.

2. In combination, a drive member, a driven member, a first clutch element for clutching said drive and driven members together, a second clutch element for clutching said drive and driven members together, means for effecting engagement of said second clutch element upon the first increment of rotation of said drive member in one direction relative to said driven member and for effecting disengagement of said second clutch element upon the first increment of rotation of said drive member in the other direction relative to said driven member, means for preventing engagement of said first clutch element when said second clutch element is disengaged, and means for effecting engagement of said first clutch element when said second clutch element is engaged or immediately before, and said last named means being operable to selectively maintain both said first and second clutch elements in engagement in either direction of rotation of said drive member relative to said driven member.

3. In combination, a drive member, a driven member, a first clutch element non-rotatably mounted on said driven member and axially movable for clutching said drive and driven members together, a second clutch element non-rotatably mounted relative to said first clutch element and axially movable for clutching said drive and driven members together, means for effecting axial movement of said second clutch element whereby the latter is disposed in engagement with said drive member upon rotation of said drive member in one direction relative to said driven member and said second clutch element is disengaged from said drive member upon rotation of said drive member in the other direction relative to said driven member, means for preventing axial movement of said first clutch element when said second clutch element is disengaged, and means for selectively effecting axial movement of said first clutch element when said second clutch element is engaged whereby said first clutch element is disposed in engagement with said drive member.

4. In combination, a drive member, a driven member, a first clutch element non-rotatably mounted relative to said driven member and axially movable for clutching said drive and driven members together, a second clutch element non-rotatably mounted relative to said first clutch element and axially movable for clutching said drive and driven members together, means for effecting axial movement of said second clutch element whereby the latter is disposed in engagement with said drive member upon rotation of said drive member in one direction relative to said driven member and said second clutch element is disengaged from said drive member upon rotation of said drive member in the other direction relative to said driven member, means for preventing axial movement of said first clutch element when said second clutch element is disengaged, and means for selectively effecting axial movement of said first clutch element when said second clutch element is engaged or being engaged whereby said first clutch element is disposed in engagement with said drive member, and said last named means being operable to selectively maintain both said first and second clutch elements in engagement with said drive member in either direction of rotation of said drive member relative to said driven member.

5. In combination, a drive member, a driven member, a first clutch element non-rotatably mounted on said driven member and axially movable for clutching said drive and driven members together, a second clutch element non-rotatably mounted relative to said first clutch element and axially movable for clutching said drive and driven members together, external helical threads formed on said second clutch element, an axially fixed annular spring carrier having internal helical threads cooperating with said external helical threads on said second clutch element, a coil spring friction clutch carried on the outer periphery of said spring carrier, said coil spring friction clutch being operable upon rotation of said drive member in one direction relative to said driven member to clutch said spring carrier to said drive member whereby said second clutch element is caused to be threaded axially into engagement with said drive member, means for preventing axial movement of said first clutch element when said second clutch element is disengaged, and means for selectively effecting axial movement of said first clutch element when said second clutch element is engaged or being engaged whereby said first clutch element is disposed in engagement with said drive member.

6. In combination, a drive member, a driven member, a first clutch element non-rotatably mounted on said driven member and axially movable for clutching said drive and driven members together, a second clutch element non-rotatably mounted relative to said first clutch element and axially movable for clutching said drive and driven members together, external helical threads formed on said second clutch element, an axially fixed annular spring carrier having internal helical threads cooperating with said external helical threads on said second clutch element, a coil spring friction clutch carried on the outer periphery of said spring carrier, said coil spring friction clutch being operable upon rotation of said drive member in one direction relative to said driven member to clutch said spring carrier to said drive member whereby said second clutch element is caused to be threaded axially into engagement with said drive member, means for preventing axial movement of said first clutch element into engagement when said second clutch element is disengaged, and means for selectively effecting axial movement of said first clutch element into engagement when said second clutch element is engaged or being engaged whereby said first clutch element is disposed in engagement with said drive member, and said last named means being operable to selectively maintain both said first and second clutch elements in engagement with said drive member in either direction of rotation of said drive member relative to said driven member.

7. In combination, a drive member, a driven member, external splines on said driven member, a first annular clutch element having internal splines adapted to cooperate with said external splines on said driven member, said first annular clutch element having radial circumferentially spaced clutch teeth, radial circumferentially spaced clutch teeth formed on said drive member adapted to cooperate with said clutch teeth on said first clutch element, external splines on said first annular clutch element, a second annular clutch element having internal splines adapted to cooperate with said external splines on said first clutch element, said second annular clutch element having radial circumferentially spaced clutch teeth, radial circumferentially spaced clutch teeth formed on said drive member adapted to cooperate with said clutch teeth on said second clutch element, external helical threads on said second clutch element, an axially fixed annular spring carrier having internal helical threads cooperating with said external helical threads on said second clutch element, a coil spring friction clutch carried on the outer periphery of said spring carrier, said coil spring friction clutch being operable upon rotation of said drive member in one direction relative to said driven member to clutch said spring carrier to said drive member whereby said second clutch element is caused to be threaded axially for effecting engagement of said clutch teeth of said second clutch element with the associated clutch teeth of said drive member, means for preventing axial movement of said first clutch element into engagement when said clutch teeth of said second clutch element are disengaged from the associated clutch teeth of said drive member, and means for selectively effecting axial movement of said first clutch element when said clutch teeth of said second clutch element are in engagement or being engaged with the associated clutch teeth of said drive member whereby said clutch teeth of said first clutch element are disposed in engagement with the associated clutch teeth of said drive member.

8. In combination, a drive member, a driven member, external splines on said driven member, a first annular clutch element having internal splines adapted to cooperate with said external splines on said driven member, said first annular clutch element having radial circumferentially spaced clutch teeth, radial circumferentially spaced clutch teeth formed on said drive member adapted to cooperate with said clutch teeth on said first clutch element, external splines on said first annular clutch element, a second annular clutch element having internal splines adapted to cooperate with said external splines on said first clutch element, said second annular clutch element having radial circumferentially spaced clutch teeth, radial circumferentially spaced clutch teeth formed on said drive member adapted to cooperate with said clutch teeth on said second clutch element, external helical threads formed on said second clutch element, an axially fixed annular spring carrier having internal helical threads cooperating with said external helical threads on said second clutch element, a coil spring friction clutch carried on the outer periphery of said spring carrier, said coil spring friction clutch being operable upon rotation of said drive member in one direction relative to said driven member to clutch said spring carrier to said drive member whereby said second clutch element is caused to be threaded axially for effecting engagement of said clutch teeth of said second clutch element with the associated clutch teeth of said drive member, means for preventing axial movement of said first clutch element when said clutch teeth of said second clutch element are disengaged from the associated clutch teeth of said drive member, and means for selectively effecting axial movement of said first clutch element when said clutch teeth of said second clutch element are in engagement or being engaged with the associated clutch teeth of said drive member whereby said clutch teeth of said first clutch element are disposed in engagement with the associated clutch teeth of said drive member, and said last named means being operable to selectively maintain said clutch teeth of both said first and second clutch elements in engagement with the associated clutch teeth of said drive member in either direction of rotation of said drive member relative to said driven member.

9. In combination, a driven member having a radial slot formed therein, a drive member overlying said driven member and arranged coaxially thereof, external splines on said driven member, a first annular clutch element having internal splines adapted to cooperate with said external splines on said driven member, said first annular clutch element having radial circumferentially spaced clutch teeth, radial circumferentially spaced clutch teeth formed on said drive member adapted to cooperate with said clutch teeth on said first clutch element, external splines on said first annular clutch element, a second annular clutch element having internal splines adapted to cooperate with said external splines on said first clutch element, said second annular clutch element having radial circumferentially spaced clutch teeth, radial circumferentially spaced clutch teeth formed on said drive member adapted to cooperate with said clutch teeth on said second clutch element, external helical threads formed on said second clutch element, an axially fixed annular spring carrier having internal helical threads cooperating with said external helical threads on said second clutch element, a coil spring friction clutch carried on the outer periphery of said spring carrier, said coil spring friction clutch being operable upon the first increment of rotation of said drive member in one direction relative to said driven member to clutch said spring carrier to said drive member whereby said second clutch element is caused to be threaded axially for effecting engagement of said clutch teeth of said second clutch element with the associated clutch teeth of said drive member, a radial pin member extending through the slot in said driven member and said first clutch element, means for spring loading said radial pin member, means on said pin member being adapted to engage said second clutch element when said clutch teeth of the latter are disengaged from said clutch teeth of said drive member for preventing axial movement of said first clutch element and engagement of said clutch teeth of said first clutch element with the associated clutch teeth of said drive member, said pin member when spring loaded and said clutch teeth of said second clutch element are in engagement or being engaged with the associated clutch teeth of said drive member being adapted to effect engagement of said clutch teeth of said first clutch element with the associated clutch teeth of said drive member, and said pin member being adapted to selectively maintain the clutch teeth of said first and second clutch elements in engagement with the associated clutch teeth of said drive member in either direction of rotation of said drive member relative to said driven member.

10. In combination, a driven member having a radial slot formed therein, a drive member, a first clutch element non-rotatably mounted on said driven member and axially movable for clutching said drive and driven members together, a second clutch element non-rotatably mounted on said first clutch element and axially movable for clutching said drive and driven members together, means for effecting axial movement of said second clutch element whereby the latter is disposed in engagement with said drive member upon rotation of said drive member in one direction relative to said driven member and said second clutch element is disengaged from said drive member upon rotation of said drive member in the other direction relative to said driven member, a radial pin member extending through the slot in said driven member and said first clutch element, means on said pin member being adapted to engage said second clutch element when the latter is disengaged from said drive member for preventing axial movement of said first clutch element and engagement of the latter with said drive member, and said pin member when said second clutch element is engaged or being engaged with said drive member being adapted to selectively effect engagement of said first clutch element with said drive member.

11. In combination, a driven member having a radial slot formed therein, a drive member, a first clutch element non-rotatably mounted on said drive member and axially movable for clutching said drive and driven members together, a second clutch element non-rotatably mounted relative to said first clutch element and axially movable for clutching said drive and driven members together, means for effecting axial movement of said second clutch element whereby the latter is disposed in engagement with said drive member upon rotation of said drive member in one direction relative to said driven member and said second clutch element is disengaged from said drive member upon rotation of said drive member in the other direction relative to said driven member, a radial pin member extending through the slot in said driven member and said first clutch element, means on said pin member being adapted to engage said second clutch element when the latter is disengaged from said drive member for preventing axial movement of said first clutch element and engagement of the latter with said drive member, said pin member when said second clutch element is disposed in engagement with said drive member being adapted to selectively effect engagement of said first clutch element with said drive member, and said pin member being adapted to selectively maintain said first and second clutch elements in engagement with said drive member in either direction of rotation of said drive member relative to said driven member.

12. In combination, a driven member having a radial slot formed therein, a drive member, a first clutch element non-rotatably mounted on said driven member and axially movable for clutching said drive and driven members together, a second clutch element non-rotatably mounted relative to said first clutch element and axially movable for clutching said drive and driven members together, external helical threads formed on said second clutch element, an axially fixed annular spring carrier having internal helical threads cooperating with said external helical threads on said second clutch element, a coil spring friction clutch carried on the outer periphery of said spring carrier, said coil spring friction clutch being operable upon rotation of said drive member in one direction relative to said driven member to clutch said spring carrier to said drive member whereby said second clutch element is caused to be threaded axially into engagement with said drive member, a radial pin member extending through the slot in said driven member and said first clutch element, means on said pin member being adapted to engage said second clutch element when the latter is disengaged from said drive member for preventing axial movement of said first clutch element and engagement of the latter with said drive member, and said pin member when said second clutch element is disposed in engagement with said drive member being adapted to selectively effect engagement of said first clutch element with said drive member.

13. In combination, a driven member having a radial slot formed therein, a drive member, a first clutch element non-rotatably mounted on said driven member and axially movable for clutching said drive and driven members together, a second clutch element non-rotatably mounted on said first clutch element and axially movable for clutching said drive and driven members together, external helical threads formed on said second clutch element, an axially fixed annular spring carrier having internal helical threads cooperating with said external helical threads on said second clutch element, a coil spring friction clutch carried on the outer periphery of said spring carrier, said coil spring friction clutch being operable upon rotation of said drive member in one direction relative to said driven member to clutch said spring carrier to said drive member whereby said second clutch element is caused to be threaded axially into engagement with said drive member, a radial pin member extending through the slot in said driven member and said first clutch element, means on said pin member being adapted to engage said second clutch element when the latter is disengaged from said drive member for preventing axial movement of said first clutch element and engagement of the latter with said drive member, said pin member when said second clutch element is engaged or being engaged with said drive member being adapted to selectively effect engagement of said first clutch element with said drive member, said pin member being adapted to selectively maintain said first and second clutch elements in engagement with said drive member in either direction of rotation of said drive member relative to said driven member.

References Cited in the file of this patent

UNITED STATES PATENTS

| 2,245,017 | Sinclair | June 10, 1941 |
| 2,433,428 | Carnagua et al. | Dec. 30, 1947 |
| 2,442,840 | Carnagua | June 8, 1948 |